(12) United States Patent
Kim et al.

(10) Patent No.: US 9,324,506 B2
(45) Date of Patent: Apr. 26, 2016

(54) AMTEC CELL AND METHOD FOR MANUFACTURING THE AMTEC CELL

(71) Applicant: KOREA INSTITUTE OF ENERGY RESEARCH, Daejeon (KR)

(72) Inventors: Sun-Dong Kim, Daejeon (KR); Sang-Kuk Woo, Daejeon (KR); Se-Young Kim, Seongnam-si (KR); Jong-Hoon Joo, Chungcheongbuk-do (KR); In-Sub Han, Daejeon (KR); Doo-Won Seo, Daejeon (KR); Min-Soo Suh, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 151 days.

(21) Appl. No.: 13/959,676

(22) Filed: Aug. 5, 2013

(65) Prior Publication Data
US 2014/0251405 A1    Sep. 11, 2014

(30) Foreign Application Priority Data
Mar. 5, 2013   (KR) .......................... 10-2013-0023350

(51) Int. Cl.
*H01J 45/00*   (2006.01)
*H01L 37/00*   (2006.01)
*H01G 9/21*    (2006.01)
*H01G 9/00*    (2006.01)

(52) U.S. Cl.
CPC ............... *H01G 9/21* (2013.01); *H01G 9/0029* (2013.01); *Y10T 29/417* (2015.01)

(58) Field of Classification Search
CPC ................. H01M 4/86; H01M 8/0271; H01G 2009/0014; H01G 9/0036; H01G 9/025
USPC ........................................... 136/205; 429/508
See application file for complete search history.

(56) References Cited

U.S. PATENT DOCUMENTS

| | | | | |
|---|---|---|---|---|
| 4,871,626 A * | 10/1989 | Williams | ......................... | 429/11 |
| 5,013,612 A * | 5/1991 | Hunt | ...................... | B23K 35/32 |
| | | | | 428/469 |
| 5,228,922 A * | 7/1993 | Sievers | .................... | F28D 15/04 |
| | | | | 136/202 |
| 5,716,731 A * | 2/1998 | Goetzer et al. | ................. | 429/103 |
| 5,942,719 A * | 8/1999 | Sievers | ..................... | H01G 9/21 |
| | | | | 136/204 |
| 8,378,208 B1* | 2/2013 | Bennett | ....................... | 136/236.1 |
| 2003/0201006 A1* | 10/2003 | Sievers et al. | ................. | 136/205 |
| 2013/0098419 A1* | 4/2013 | Rossi et al. | .................... | 136/224 |

FOREIGN PATENT DOCUMENTS

KR    10-2011-0135291 A    12/2011

* cited by examiner

*Primary Examiner* — Jennifer Michener
*Assistant Examiner* — Bethany L Martin
(74) *Attorney, Agent, or Firm* — Revolution IP, PLLC

(57) ABSTRACT

Disclosed is a modularized AMTEC cell which does not require a separate collector by using a metal support as an internal electrode, has durability and stability even at a high temperature and a high pressure, very easily joins the cell to a housing by inserting the cell into an insulating portion and sealing, minimizes the number of the parts and expands easily the system scale through the serial-parallel structure.

10 Claims, 5 Drawing Sheets

AMTEC CELL AND METHOD FOR MANUFACTURING THE AMTEC CELL

CROSS REFERENCE TO PRIOR APPLICATIONS

This application claims priority under 35 U.S.C. §119 to Korean Patent Application No. 10-2013-0023350, filed on Mar. 5, 2013, which is hereby incorporated by reference in its entirety.

BACKGROUND

1. Field

The present invention relates to an AMTEC cell, and more particularly to a modularized AMTEC unit cell which uses a metal support as an internal electrode, is easy to be installed, has a very low possibility of defect during an assembly process and has the minimum number of parts.

2. Description of Related Art

An Alkali Metal Thermal to Electric Converter (AMTEC) technology is a technology of converting thermal energy into electrical energy. In early times, while the AMTEC technology starts from a power source for space, it is employed as a technology of collecting the waste heat and is now issued as a promising technology replacing the existing technologies.

The process of generating electricity in the AMTEC will be specifically described. After the state of Na vapor is changed into a vapor state in a high temperature and high pressure evaporator by a heat source, Na+ passes through beta-alumina solid electrolyte (BASE), and free electrons return to a cathode through an electric load from an anode, and then are recombined with ion generated from the surface of a low temperature and low pressure BETA and then is neutralized. Electricity is generated during this process.

The vapor pressure of Na plays the most significant role in a thermal conversion generator as an energy source or a driving force which generates electricity. Also, free electrons generated during a process in which Na passes through the solid electrolyte due to a concentration difference and temperature difference of a working fluid are collected through electrodes, so that electricity can be generated.

Unlike a conventional power generation method, The AMTEC is comprised of power generation cells capable of generating electricity without using a driver such as a turbine, a motor or the like, so that it can directly generate electricity from a portion contacting with the heat. When the AMTEC is formed in the form of a module in series or in parallel, a great amount of electricity of several KW to several hundredths MW can be generated.

In the publication of Korean Patent Application No. 10-2011-0135291, disclosed is a unit thermal conversion power generator and a thermal conversion power generation system including: a case including a first end and a second end; a working fluid disposed within the case; a solid electrolyte partitioning the inside of the case; a first electrode disposed on one side of the solid electrolyte; a second electrode disposed on one other side of the solid electrolyte; and a heat source heating alternately the first end and the second end.

SUMMARY

In order to collect electricity generated from an AMTEC cell, the electricity should be collected by an internal electrode formed on the inner surface of a solid electrolyte. The internal electrode should be maintained sealed so as to generate electrons during a process in which Na ion passes through the solid electrolyte.

A conventional AMTEC cell requires a process in which an electricity collection structure such as Mo mesh is inserted and then is connected to a bus bar (Ta rod) in order to internally collect electricity. However, in the mesh for the internal electricity collection, resistance caused by an interfacial adhesive force occurs and reproductivity is reduced.

Also, an airtight/joining portion is created between a ceramic cell and the portion supporting the Ta rod, so that there is a very high possibility of defects in a high temperature corrosive environment.

To seal the internal electrode, there is a requirement for a multi-layer joiner including an alpha alumina insulation structure. In the conventional technology, due to a large number of the parts required during this process, there has been a high possibility of defects, for example, leak, airtight break and the like. Also, the structure includes a variety of joiners like beta alumina-alpha alumina-metal, etc., so that when impact, etc., are given to the various joiners during a mounting process of constructing a system, there exists a danger of destruction and leak.

Therefore, the AMTEC unit cell and electricity collecting/sealing function cannot be separated. Accordingly, there is a requirement for a technology for easily attaching or detaching the AMTEC unit cell through assemblization.

To overcome the problems above, the present invention is to provide an AMTEC unit cell which easily internally collects electricity, is free from internal electricity collection short and short-circuit, etc., and has no electrical loss caused by the interface. This is possible by manufacturing the AMTEC unit cell through use of a porous metal support. The porous metal support not only functions as the internal electrode but also collects electricity without an electricity collection structure. Also, the porous metal support functions as a support for the AMTEC cell and has durability and stability even at a high temperature and a high pressure. The head of the metal support is dense and fine, so that the internal electrode is opened to the outside. Accordingly, electricity can be easily collected by the internal electrode.

There are requirements that the joiner should be treated with ease in the sealing process, the unit cell and housing should be simply assembled, the number of the joiners should be smaller, and the system scale should be easily expanded through a serial-parallel structure. For this, the lower portion of the metal supporting unit cell is joined through use of alumina and anodizing metal, and a bus bar is formed on a metal part of which the end is dense and fine. As a result, the unit cell is manufactured to have a structure easy to be modularized.

The AMTEC unit cell of the present invention is manufactured to have a structure easy to be modularized by using the porous metal support as the internal electrode, by joining the lower portion of the metal supporting unit cell through use of alumina and anodizing metal, and by forming a bus bar or an internal electrode lead on a metal part of which the end is dense and fine. As a result, it is possible to easily internally collect electricity and to allow the joiner to be treated with ease in the sealing process. Specifically, the AMTEC unit cell is free from internal electricity collection short and short-circuit, etc., has no electrical loss caused by the interface and has a wider joining portion between the unit cell and the insulating portion. Accordingly, the joining becomes stronger, the number of the defects is significantly small, the unit cell and housing are very simply assembled, the number of the parts is reduced and the system structure becomes simpler.

Also, the system scale can be easily expanded through the serial-parallel structure between the AMTEC unit cells.

DETAILED DESCRIPTION

Figure 1A:
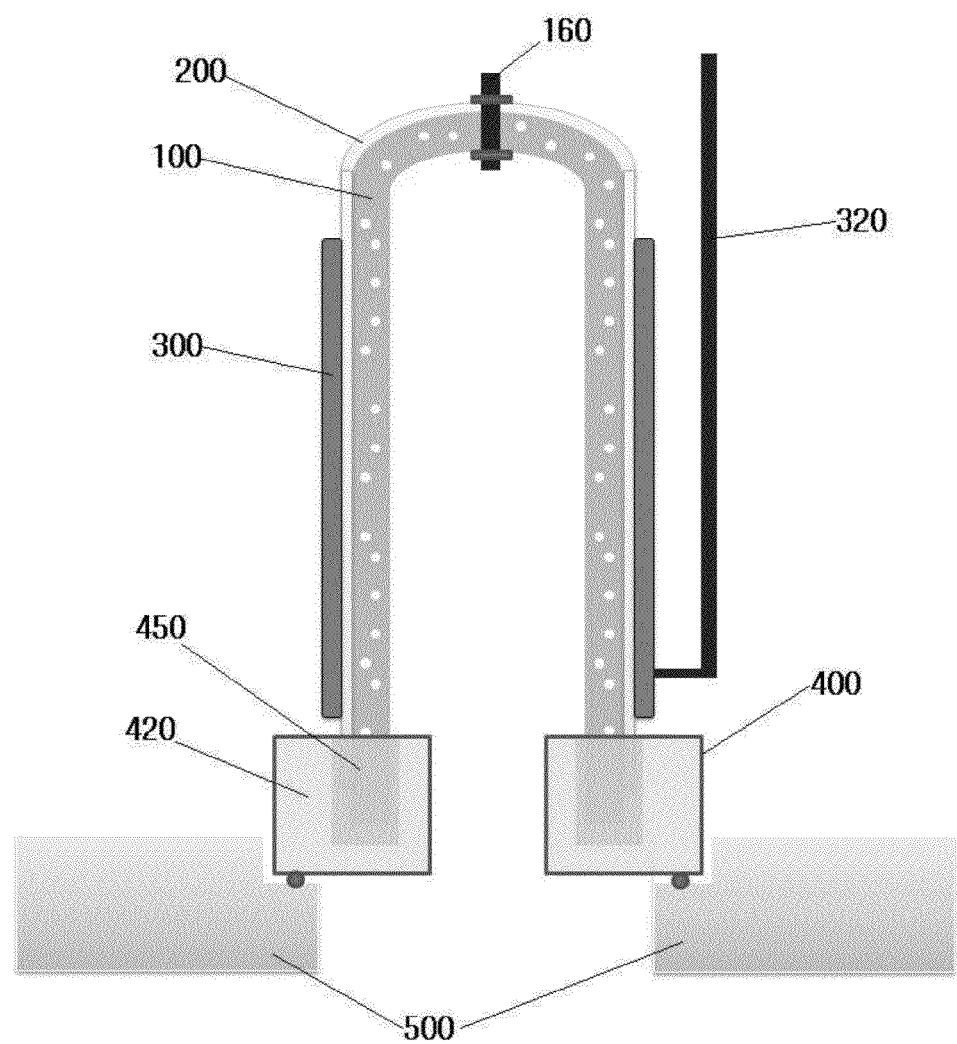
FIG. 1a-1b are views showing configurations of a modularized AMTEC cell of the present invention.

A modularized AMTEC cell and a method for manufacturing the same will be described with reference to the accompanying drawings FIG. 1a is a view showing a configuration of a modularized AMTEC cell of the present invention. The modularized AMTEC cell includes a base tube including a metal support, a housing 500 supporting the base tube, and a joiner 400 which is located between the base tube and the housing 500 and performs functions of insulation and sealing. Here, the base tube includes a tubular porous metal internal electrode 100 which functions as the metal support and has one closed side and the other open side, a solid electrolyte 200 which is formed on the outer surface of the internal electrode 100, an external electrode 300 which is formed on the outer surface of the solid electrolyte 200, and an external electrode lead wire 320.

Figure 1B:
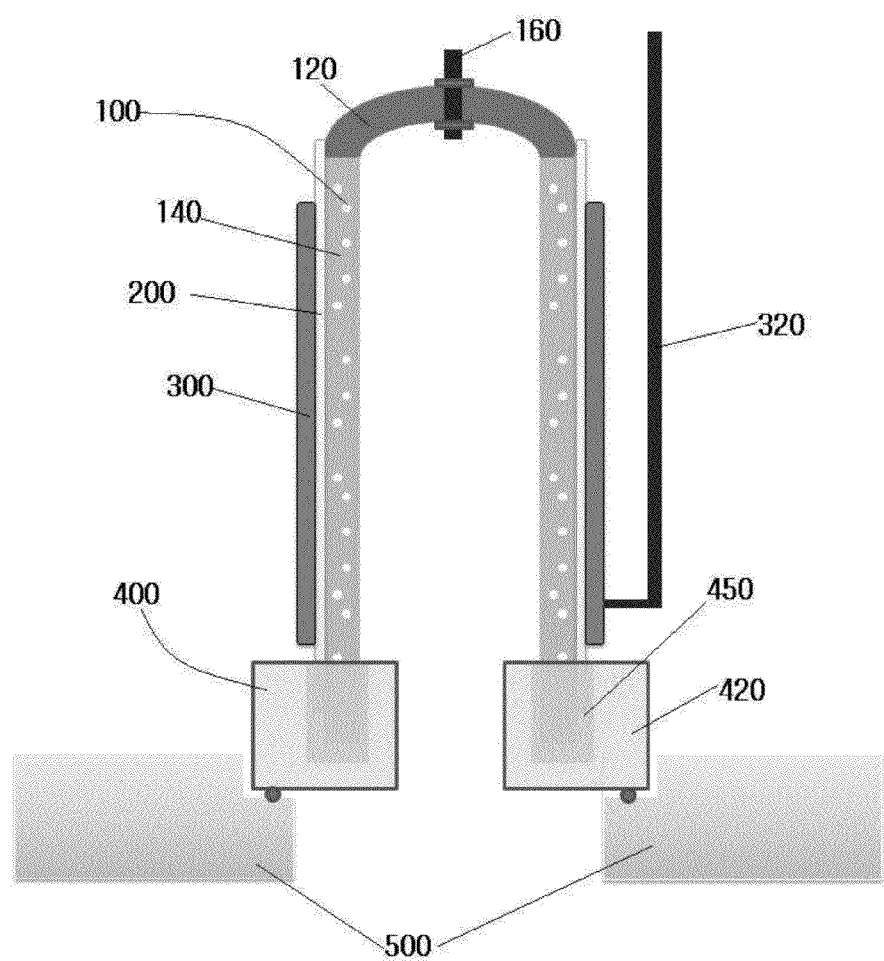

FIG. 1b is a view showing a configuration of the modularized AMTEC cell of the present invention. The modularized AMTEC cell includes the base tube in which a portion of the internal electrode 100 is opened, the housing 500 supporting the base tube, and the joiner 400 which is located between the base tube and the housing 500 and performs functions of insulation and sealing. Here, the base tube includes the internal electrode 100 including a head 120 and a cylindrical body 140. The head 120 has one closed side and the other open side, and the body 140 has open both sides. The base tube also includes an internal electrode lead 160 placed on the head 120, the solid electrolyte 200 formed on the outer surface of the body, an external electrode 300 formed on the outer surface of the solid electrolyte 200, and the external electrode lead wire 320. Here, the pores are sealed such that gas is not allowed to pass through the head 120. The head 120 of the internal electrode 100 is filled with a metal filler so as to seal the pores by using any one of a metal melt infiltration method and a filler metal method. However, there is no limit to this. The head 120 of the internal electrode 100 should be sealed not to allow the gas to pass through the head 120 in the base tube in which the internal electrode 100 is opened, because when the gas passes through the head 120, an internal pressure is reduced and efficiency is deteriorated. Also, in this case, Na gas functioning as a working fluid moves to the outside of the cell without supplying free electrons to thereby consequently reduce power generation efficiency.

Figure 2:
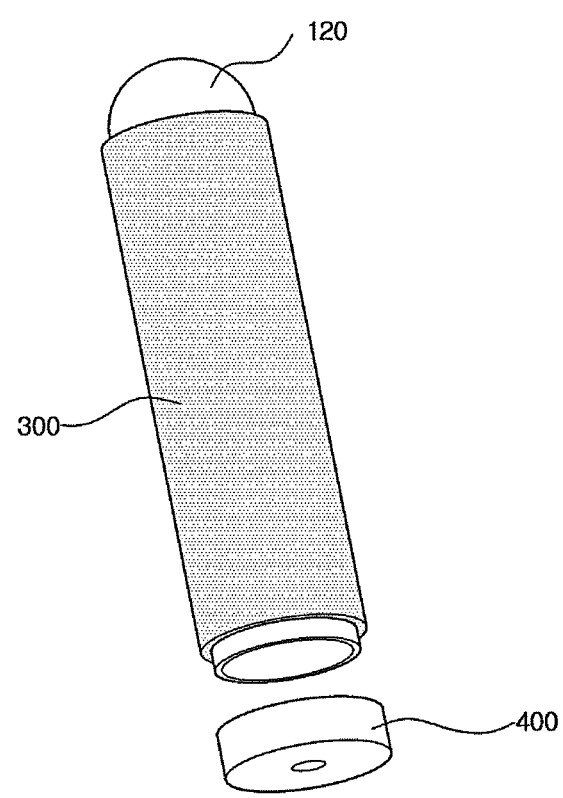
FIG. 2 is a view showing a configuration of a portion of the modularized AMTEC cell of the present invention.

FIG. 2 is a view showing a configuration of a portion of the modularized AMTEC cell of the present invention. The base tube and the joiner are shown in FIG. 2. The joiner 400 has opened both sides allowing the gas to pass therethrough and has a cylindrical shape with an empty interior. The shape may be variously changed according to the shape of the base tube and is not limited to this embodiment. Here, the joiner 400 includes an insulating portion 420 and a sealing portion 450. The insulating portion 420 has a recess formed in a portion of the joiner 400, which is joined with the base tube. The base tube is inserted into the joined portion. After the base tube is inserted into the recess, the sealing portion 450 is formed on the rest space. Here, the external electrode 300 of the base tube is not inserted into the recess and the lower portion of either the internal electrode 100 or the solid electrolyte 200 is inserted and fixed into the recess. In a case where the external electrode 300 is inserted into the recess, when the sealing portion 450 is made of a conductive material, the internal electrode 100 is electrically connected to the external electrode 300. Therefore, to prevent this problem, it is recommended that the external electrode 300 should be formed except for the portion of the insulating portion 420, into which the base tube is inserted. Here, the sealing portion 450 performs a sealing process in such a manner as not to allow the gas to pass therethrough, and then the insulating portion 420 is joined with the base tube.

The insulating portion 420 includes any one of alpha alumina, anodizing metal and enamel coated metal. However, there is no limit to this. The insulating portion 420 insulates the base tube from the housing 500 such that the base tube and the housing 500 are not electrically connected to each other. By doing this, the free electrons collected by the internal electrode 100 are prevented from moving toward the housing 500. Thus, the free electrons are allowed to move only through the internal electrode lead 160.

The sealing portion 450 includes any one of a carbon ring, a gold ring, a silver ring, a brazing filler. However, there is no limit to this.

The insulating portion 420 of the joiner 400 is joined with the housing 500 by using any one of welding, O-ring and brazing. However, there is no limit to this.

The material of the internal electrode 100 includes at least any one of molybdenum, titanium, tungsten, copper, nickel, nickel-iron alloy, stainless steel, iron and bronze, and is not limited to this. Here, the internal electrode 100 performs a function of supporting the base tube, thereby providing durability and stability at a high temperature and a high pressure. Also, since an internal electrode support is used, the solid electrolyte can be coated with a thin film, so that the power generation efficiency is enhanced. A collector is not required due to the use of the internal electrode 100 of the metal support.

The solid electrolyte is formed of any one of a beta-alumina based solid electrolyte and a Na super-ionic conductor (NASICON) based solid electrolyte. At present, a beta"-alumina based solid electrolyte is commonly used the most.

The material of the external electrode 300 may include at least any one of molybdenum, nickel, aluminum, PtW, RhW, TiC, TiN, SiN, RuO, $Ru_2O$ and Rh2W, and are not limited to this.

Figure 3A:
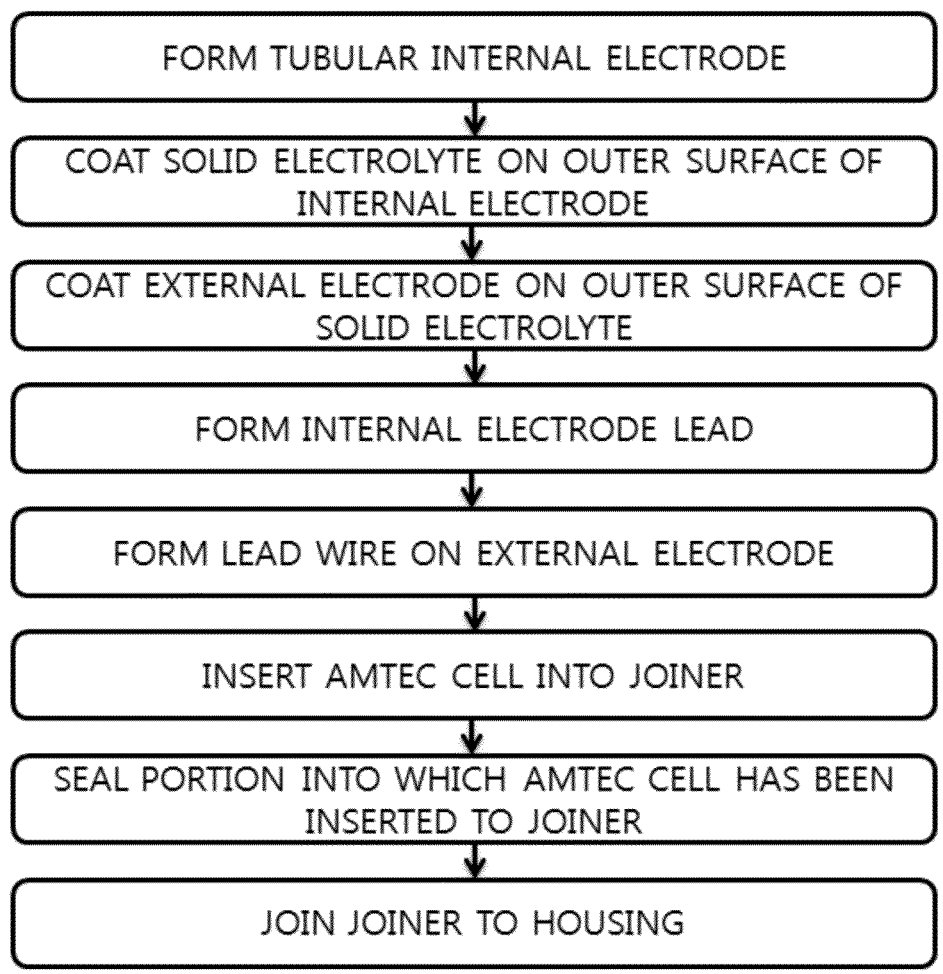
FIG. 3a-3b are flowcharts showing, step by step, methods for manufacturing the modularized AMTEC cell of the present invention.

FIG. 3a is a flowchart showing, step by step, a method for manufacturing the modularized AMTEC cell of the present invention. The method for manufacturing the modularized AMTEC cell includes forming the tubular metal internal electrode 100 which functions as the metal support and has one closed side and the other open side, forming a solid electrolyte 200 coating layer on the outer surface of the internal electrode 100 in the form of a thin film by using a coating process, coating the porous external electrode 300 on the surface of the solid electrolyte 200 coating layer, forming the internal electrode lead 160 on the upper portion of the cell, forming the external electrode lead wire 320 on the external electrode 300, inserting the base tube such that a portion of the lower portion of the internal electrode 100 or portions of the lower portions of the internal electrode 100 and the solid electrolyte 200 is inserted into the joiner 400, sealing the portion into which the base tube has been inserted to the joiner 400, and joining the joiner 400 to the housing 500.

Figure 3B:
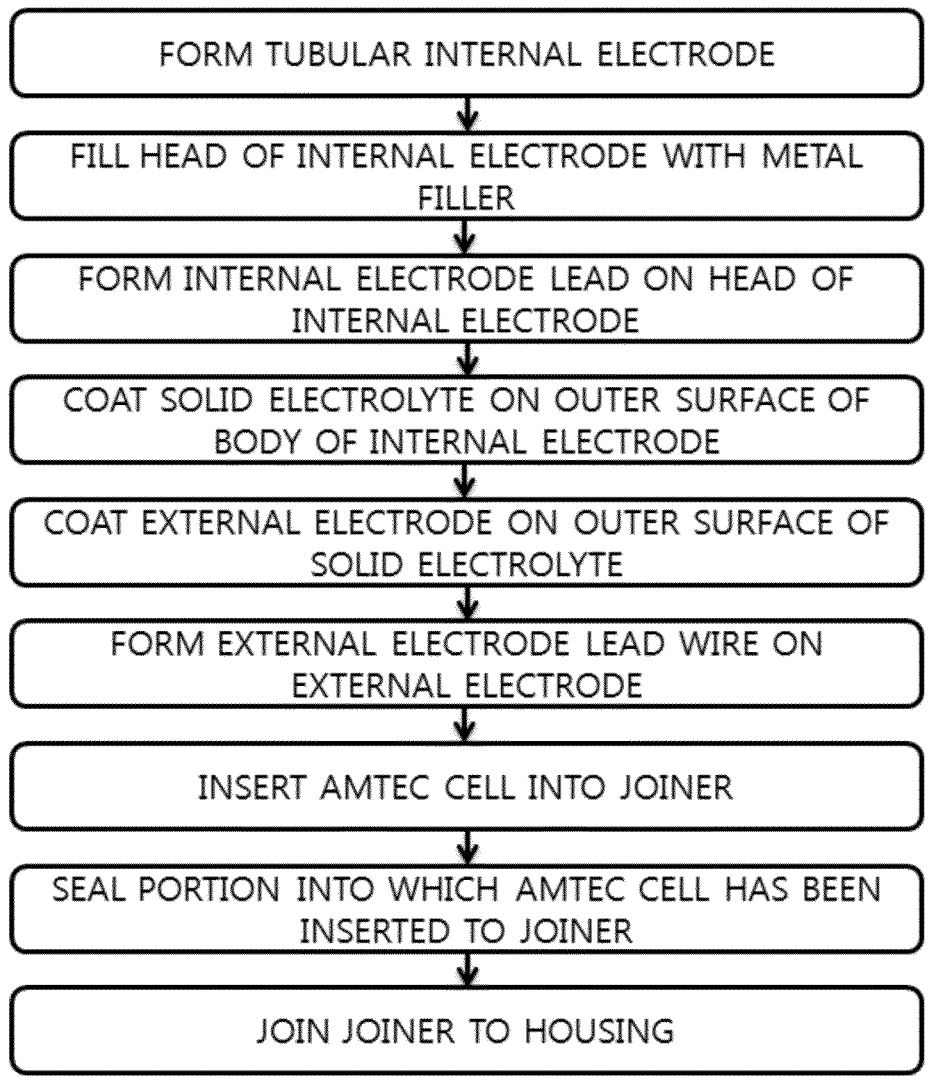

FIG. 3b is a flowchart showing, step by step, a method for manufacturing the modularized AMTEC cell of the present invention. The method for manufacturing the modularized AMTEC cell includes fabricating the tubular porous metal internal electrode 100 which includes the head 120 having one closed side and the other open side and the cylindrical body 140 having open both sides, filling the head 120 with a metal filler so as to seal the pores, forming the internal electrode lead 160 on the head 120, coating the solid electrolyte 200 on the outer surface of the body 140 in the form of a thin film, coating the external electrode 300 on the outer surface of the portion coated with the solid electrolyte 200, forming the external electrode lead wire 320 on the external electrode 300, inserting the base tube such that a portion of the lower portion of the internal electrode 100 or portions of the lower portions of the internal electrode 100 and the solid electrolyte 200 is inserted into the joiner 400, sealing the portion into which the base tube has been inserted to the joiner 400, and joining the joiner 400 to the housing 500.

The material of the internal electrode 100 includes at least any one of molybdenum, titanium, tungsten, copper, nickel, nickel-iron alloy, stainless steel, iron and bronze, and is not limited to this.

The solid electrolyte is formed of any one of a beta-alumina based solid electrolyte and a Na super-ionic conductor (NA-SICON) based solid electrolyte. At present, a beta"-alumina based solid electrolyte is commonly used the most. Here, the solid electrolyte 200 is coated in the form of a thin film by using at least one of a thermal spray coating process and a plasma coating process. However, there is no limit to this embodiment.

With the exception of the portion inserted into the insulating portion 420 of the joiner 400 among the portion on which the solid electrolyte 200 has been coated, the external electrode 300 is coated on the outer surface of the solid electrolyte 200. The external electrode 300 is not inserted into the insulating portion. The material of the external electrode 300 may include at least any one of molybdenum, nickel, aluminum, PtW, RhW, TiC, TiN, SiN, RuO, Ru$_2$O and Rh2W, and are not limited to this.

An AMTEC power generator may be manufactured by including a plurality of the modularized AMTEC cells. Here, the system scale can be easily expanded by connecting in series or in parallel the AMTEC cells.

The present invention has been described with reference to the accompanying drawings. This is just one of various embodiments including the subject matter of the present invention and intends to allow those skilled in the art to easily embody the present invention. It is clear that the present invention is not limited to the above-described embodiments. Therefore, the scope of the present invention should be construed by the following claims. Without departing from the subject matter of the present invention, all the technical spirits within the scope equivalent to the subject matter of the present invention is included in the right scope of the present invention by the modifications, substitutions, changes and the like. Also, it is clear that some of the drawing configuration are intended for more clearly describing the configuration and are more exaggerated or shortened than the actual one.

What is claimed is:

1. A modularized AMTEC cell comprising:
   a cylindrical base tube including a continuous internal electrode serving as a metal support, the base tube having a concave closed end formed by the internal electrode and an open end;
   an internal electrode lead penetrating through the closed end of the base tube;
   a housing supporting the base tube;
   a joiner, which is located between the base tube and the housing, including an insulating portion and a sealing portion, the insulating portion having a recess formed in a portion of the joiner, the recess being formed to be joined with a lower portion of the internal electrode of the base tube, and the sealing portion being formed to seal the base tube in which the lower portions of the internal electrode and a solid electrolyte are inserted into the joiner, the solid electrolyte being formed on an outer surface of the internal electrode; and
   an external electrode being formed on an outer surface of the solid electrolyte, and an external electrode lead wire being formed on the external electrode.

2. The modularized AMTEC cell of claim 1, wherein the joiner includes two ends having an opening at both ends allowing gas to pass therethrough, the joiner comprising a cylindrical shape with an empty interior.

3. The modularized AMTEC cell of claim 2, wherein
   the sealing portion is provided to seal the base tube in such a manner as not to allow gas to pass therethrough, and
   the insulating portion is joined with the base tube.

4. The modularized AMTEC cell of claim 1, wherein the insulating portion comprises at least one of alpha alumina, anodizing metal and enamel coated metal, and wherein
   the insulating portion is provided to insulate the base tube from the housing such that the base tube and the housing are not electrically connected to each other.

5. The modularized AMTEC cell of claim 3, wherein the sealing portion comprises at least one of a carbon ring, a gold ring, a silver ring, and a brazing filler.

6. The modularized AMTEC cell of claim 3, wherein the insulating portion of the joiner is joined with the housing by using at least one of welding, O-ring and brazing.

7. The modularized AMTEC cell of claim 1, wherein the internal electrode comprises at least one of molybdenum, titanium, tungsten, copper, nickel, nickel-iron alloy, stainless steel, iron and bronze.

8. The modularized AMTEC cell of claim 1, wherein the solid electrolyte is formed of at least one of a beta-alumina based solid electrolyte and a Na super-ionic conductor (NA-SICON) based solid electrolyte.

9. The modularized AMTEC cell of claim 1, wherein a material of the external electrode comprises at least one of molybdenum, nickel, aluminum, PtW, RhW, TiC, TiN, SiN, RuO, Ru$_2$O and Rh2W.

10. An AMTEC power generator comprising a plurality of the modularized AMTEC cells of claim 1.

* * * * *